United States Patent [19]
Nicolai

[11] Patent Number: 5,769,519
[45] Date of Patent: Jun. 23, 1998

[54] SWITCHGEAR CABINET WITH FRAMEWORK AND BASE

[75] Inventor: Walter Nicolai, Buseck, Germany

[73] Assignee: Rittal-Werk Rudolf Loh GmbH & Co. KG, Herborn, Germany

[21] Appl. No.: 750,944

[22] PCT Filed: Mar. 1, 1996

[86] PCT No.: PCT/EP96/00870

§ 371 Date: Feb. 10, 1997

§ 102(e) Date: Feb. 10, 1997

[87] PCT Pub. No.: WO96/27930

PCT Pub. Date: Sep. 12, 1996

[30] Foreign Application Priority Data

Mar. 7, 1995 [DE] Germany .................. 195 07 728.8

[51] Int. Cl.⁶ ..................................... H02B 1/00
[52] U.S. Cl. ..................................... 312/351.1; 312/265.4; 248/581; 248/632; 211/26
[58] Field of Search .................... 312/351.1, 352, 312/265.1, 265.2, 265.3, 265.4, 223.1, 257.1; 248/638, 581, 634, 632; 52/167.1, 167.4, 167.7, 167.8, 167.9; 211/26

[56] References Cited

U.S. PATENT DOCUMENTS

| | | | |
|---|---|---|---|
| 1,873,009 | 8/1932 | Miller, Jr. et al. | 248/632 X |
| 2,014,581 | 9/1935 | Norton | 248/581 |
| 2,404,403 | 7/1946 | Poylo | 248/638 X |
| 3,265,419 | 8/1966 | Durnbaugh et al. | 312/265.1 X |
| 4,592,602 | 6/1986 | Kuster et al. | 312/330.1 X |
| 4,766,708 | 8/1988 | Sing . | |
| 5,228,762 | 7/1993 | Mascrier | 312/265.4 |
| 5,289,348 | 2/1994 | Miller . | |
| 5,333,950 | 8/1994 | Zachrai | 312/265.4 X |
| 5,383,723 | 1/1995 | Meyer | 312/265.4 |

FOREIGN PATENT DOCUMENTS

| | | | |
|---|---|---|---|
| 0457058 | 4/1991 | European Pat. Off. . | |
| 3917985 | 12/1989 | Germany | 312/352 |
| 9307113 | 5/1993 | Germany . | |
| 9100221 | 1/1991 | WIPO . | |
| WO93/09697 | 5/1993 | WIPO | 312/223.1 |

Primary Examiner—Peter M. Cuomo
Assistant Examiner—Janet M. Wilkens
Attorney, Agent, or Firm—Speckman Pauley Petersen & Fejer

[57] ABSTRACT

A switchgear cabinet having a framework secured on a frame-like base. The framework has branches and is closed or closable by wall elements and at least one door. In order to design a switchgear cabinet that is as earthquake-proof as possible, a bottom side of the branches of a lower frame of the framework is connected by a plate-like damper frame to the top side of the base, which in turn may be fixed to a cabinet supporting surface.

14 Claims, 4 Drawing Sheets

SWITCHGEAR CABINET WITH FRAMEWORK AND BASE

BACKGROUND OF THE INVENTION

1. Field of the Invention

This invention relates to a switchgear cabinet with a rack fastened on a frame base, which is assembled from frame legs and is closed or can be closed with wall elements and at least one cabinet door.

2. Description of Prior Art

In known switchgear cabinets of this type, the base and the rack are fixedly connected with each other and form a rigid unit together with the wall elements fixed on the rack, in which built-ins are fixedly installed. If such a switchgear cabinet is employed in an earthquake area, there is the danger that great damage can be caused because of the solid, rigid construction, which leads to complete breakdown.

SUMMARY OF THE INVENTION

It is one object of this invention to produce a switchgear cabinet of the type mentioned above, which resists forces occurring in the course of an earthquake and, if possible, remains able to function, wherein simple parts can be used, which can also be retrofitted in standard cabinets.

In accordance with this invention this object is attained with a lower frame of a rack connected by the undersides of frame legs by a plate-shaped damping frame to the top of the base, which can be fixedly connected with the support surface.

Through the damping frame, the base fixedly connected with the support surface allows a displacement, limited on all sides, of the rack, so that the forces transmitted by an earthquake through the base are absorbed by the damping frame. The rack can be displaced as a unit with respect to the base, so that damages are considerably reduced, if not even prevented. It is possible in connection with a standard cabinet to easily retrofit the damping frame after removal of the base.

In accordance with one embodiment of this invention, the top of the base supports U-shaped rails in a frame shape, which form a receptacle, open at the top, for the plate-shaped damping frame, so that laterally acting shearing and tensile forces can be absorbed by the damping frame.

An unintentional release of the rack from the base is prevented in that the rack and the base are loosely connected with each other in the corner areas, through the damping frame, by screws.

In accordance with a further embodiment, near the lower frame of the rack facing the interior space of the switchgear cabinet, there is a guide frame with guide bars for a mounting plate with small guide blocks fastened on the plate-shaped damping frame. The mounting plate with the devices or the like fastened thereon is also housed resiliently on all sides in the rack. In this case the guide frame is not in connection with the switchgear cabinet and is resiliently fastened on all sides. It is also possible to utilize only guide rails in place of the guide frame.

Dependability can further be increased when the rack is resiliently suspended in an area of its upper frame by spring elements on a support rail or a support frame which can be fixed on a wall or a cover.

A further embodiment provides that the damping frame has a vertical bar which fills the space between the frame legs of the lower frame of the rack and the guide frame.

BRIEF DESCRIPTION OF DRAWINGS

This invention is explained in view of an exemplary embodiment represented in the drawings wherein.

DETAILED DESCRIPTION OF PREFERRED EMBODIMENTS

Figure 1:
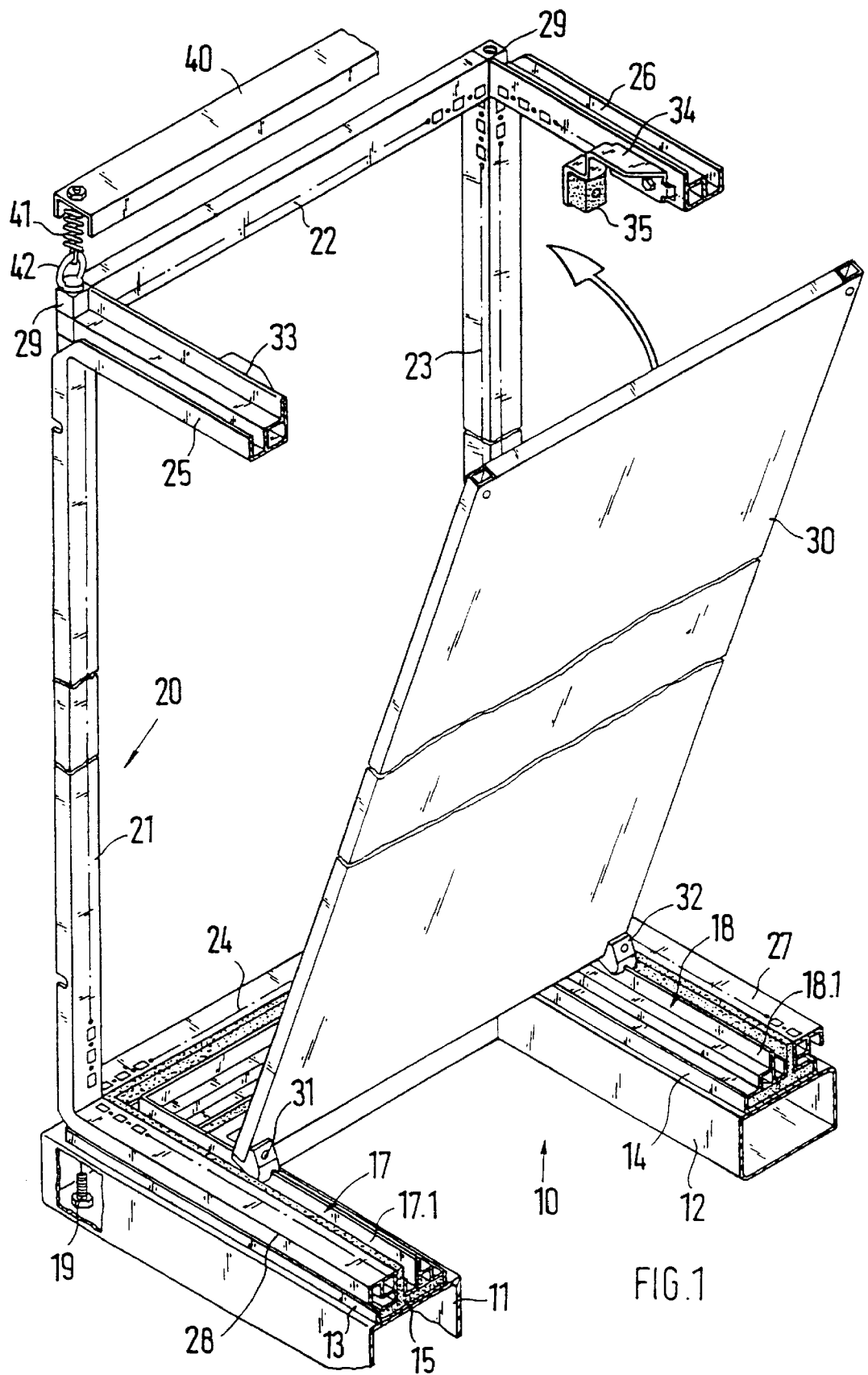
FIG. 1 is a perspective view of a basic structure of a switchgear cabinet with a base, damping frame, rack and mounting plate.

The lateral legs 11 and 12 of the frame base 10 is shown in FIG. 1, which in such embodiment are square hollow profiled sections which can be fastened to a support surface in a known manner, for example by screwing. The lower and upper frames of the rack 20 are only partially shown in FIG. 1. The frame legs 21, 22, 23 and 24 form the rear frame of the rack 20, wherein it is also possible to employ corner connectors 29 at the corners for assembling the rack 20.

Figure 2:
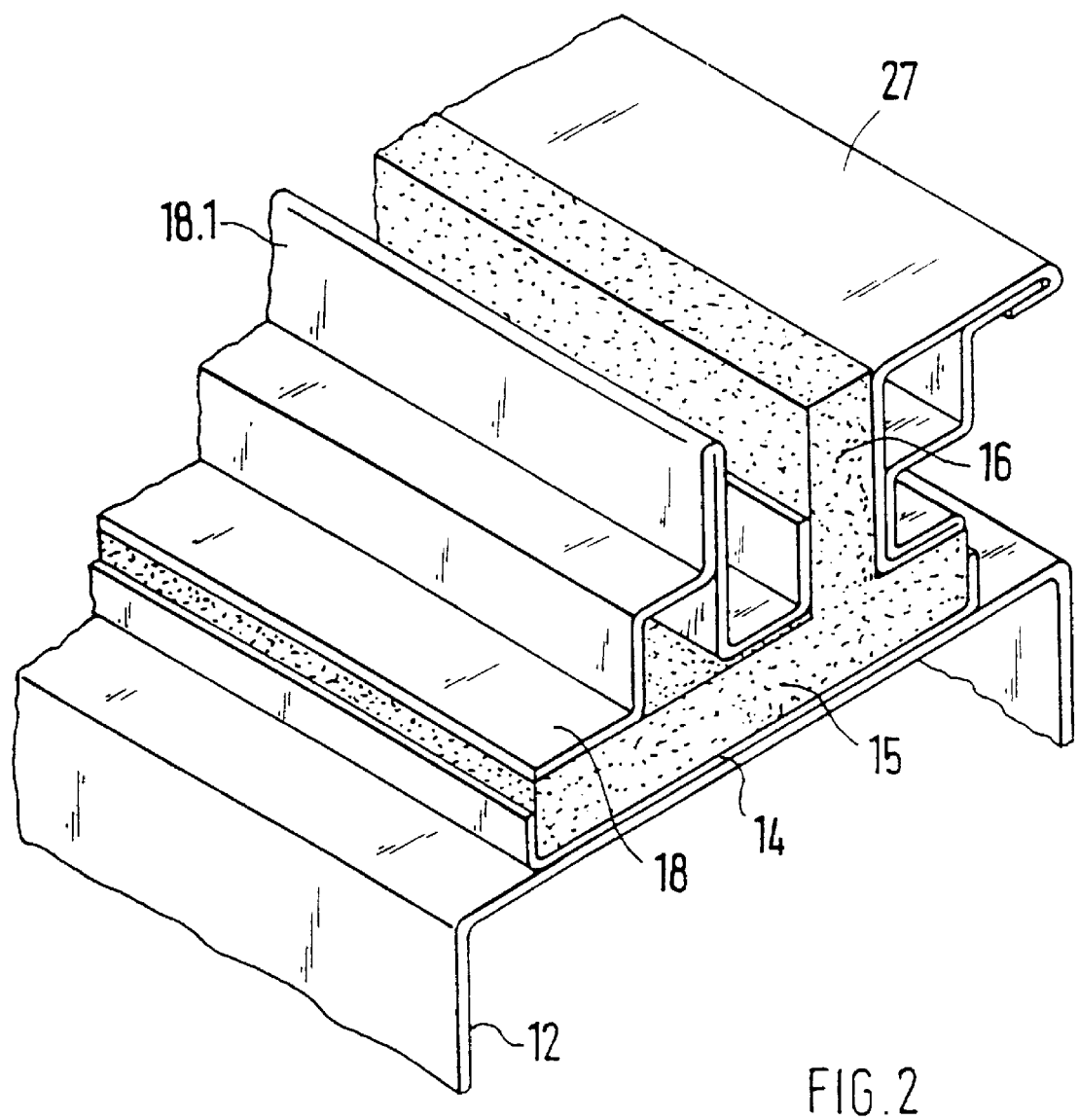
FIG. 2 is a perspective partial view of a connection between the base, damping frame, guide frame and rack.

The lower frame is connected by means of the undersides of frame legs 24, 27, 28 with the top of the base 10 via a plate-shaped damping frame 15. In this case the damping frame 15 is laterally maintained by means of a U-shaped support frame, having lateral legs, or rails identified with element reference numerals 13 and 14, as clearly shown in FIG. 2. The frame legs 25 and 26, which are used as depth struts, branch off from the upper rear frame leg 22 and, together with the lower frame legs 27 and 28 used as depth struts, lead to the front frame, not shown, of the rack 20.

As a screw 19 in a corner area of the base 10 shows, the base 10 is loosely screwed together with the rack 20 through the damping frame 15 in order to limit movement of the parts away from each other and to prevent unintended separation. A guide frame for a mounting plate 30 is fastened on the damping frame 15 inside the lower frame of the rack 20. The damping frame 15 supports a vertical bar 16, which fills up the space between the lower frame of the rack 20 and the guide frame. The lateral legs 17 and 18 of the guide frame are indicated, which form vertically upwardly directed, double-layered guide bars 17.1 and 18.1. The mounting plate 30, which has small guide blocks 31 and 32 on the underside, can be pushed into a switchgear cabinet on these guide bars 17.1 and 18.1.

Figure 4:
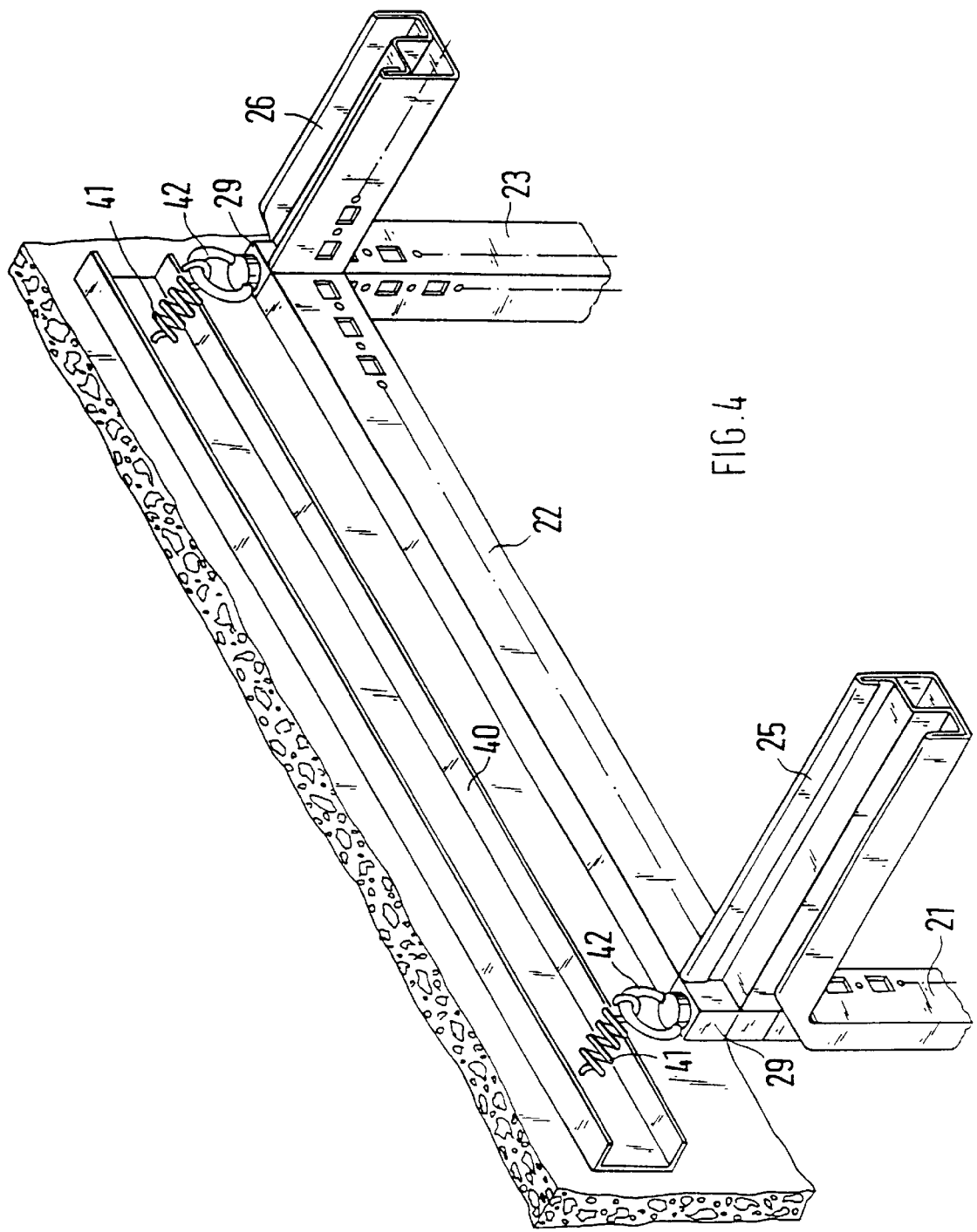
FIG. 4 is a perspective view of a resilient attachment of an upper area of a rack on a wall, according to one preferred embodiment of this invention.

The upper area of the mounting plate 30 is fastened with small damping blocks 35 on the fastening elements 33 and 34, which are attached to the upper frame legs 25 and 26, used as depth struts. In this way the mounting plate 30 with devices and the like fastened thereon is also adjustable, limited on all sides, as a unit in the rack 20, so that forces are even better absorbed. The upper area of the rack 20 can be suspended via spring elements 41 on the support rails 40 or on a support frame, fastened on the cover. In this embodiment screw hooks 42 are screwed into the corner connectors 29, which have threaded receivers, as shown in FIG. 1. As shown in FIG. 4, the upper area of the rack 20 can also be resiliently fastened on one or more walls, wherein the spring elements 41 act horizontally. These spring elements 41 are preferably embodied as helical screws which can absorb both tensile and pressure forces.

Figure 3:
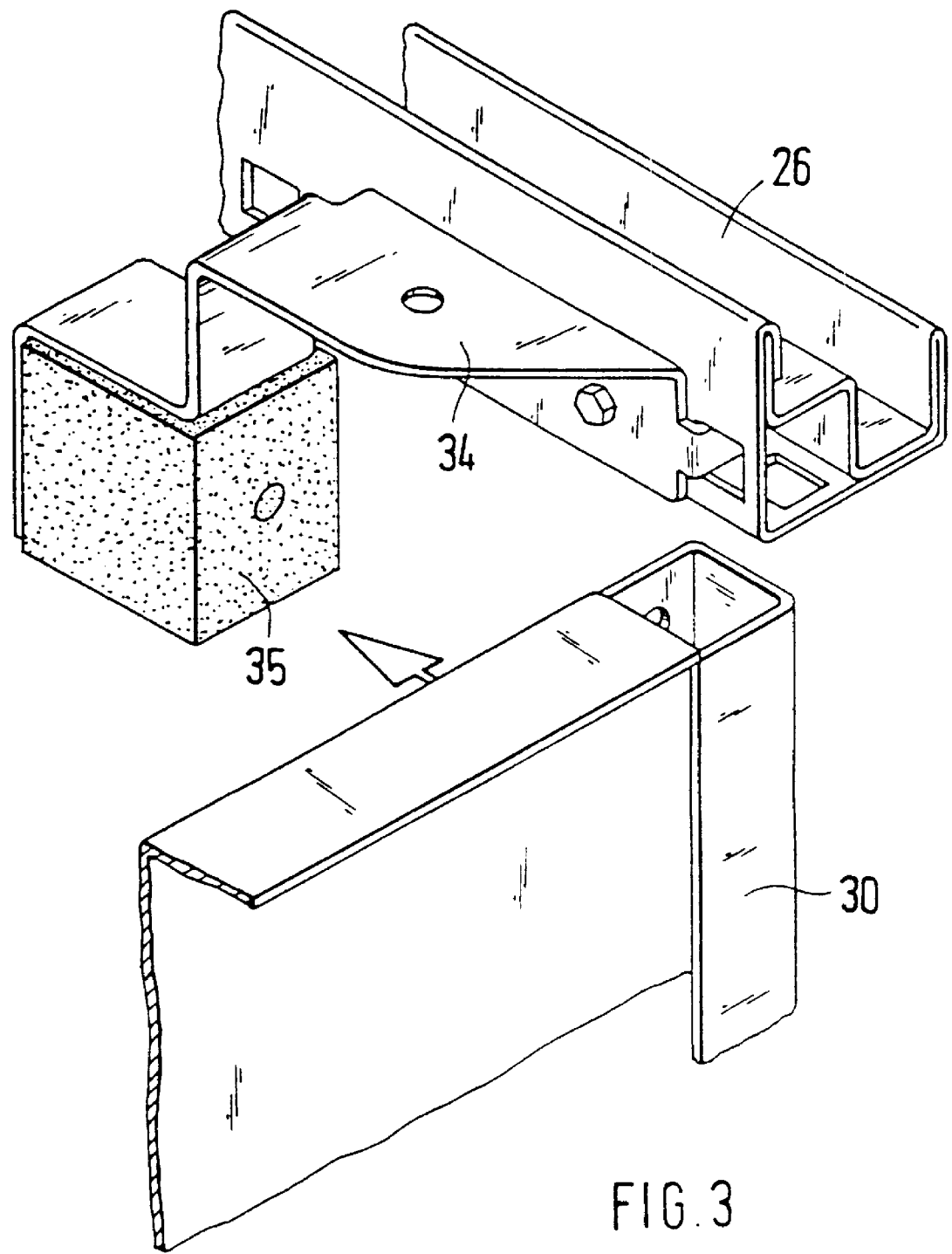
FIG. 3 is a perspective exploded partial view of a connection of an upper area of a mounting plate with the rack.

An upper connection between the mounting plate 30 and a frame leg 26 of the rack 20, used as a depth strut, is represented in FIG. 3. The fastening element 34 is screwed to the frame leg 26 and by means of small damping blocks 35 is fastened, which results in play damped on all sides, for the mounting plate 30.

It is clear that the damping frame 15 and the small damping blocks 35 can also be later used for retrofitting the switchgear cabinet, since the rack 20 continues to be a single unit and need only be released from the base.

I claim:

1. In a switchgear cabinet with a rack fastened on a frame base, wherein the rack is assembled with frame legs and the rack is closed by a wall element, the improvement comprising:

a lower frame of the rack (20) connected by undersides of the frame legs (24, 27, 28) by a plate-shaped damping frame (15) to a top of the base (10), the cabinet further includes a mounting plate (30), a plurality of guide blocks (31 32) attached to the mounting plate (30), the guide blocks (31,32) and located near the lower frame of the rack (20) and an interior space of the switchgear cabinet, and a guide frame having a plurality of guide bars (17.1, 18.1) for the guide blocks (31, 32) being fastened on the damping frame (15).

2. In a switchgear cabinet in accordance with claim 1, wherein the top of the base (10) supports a plurality of U-shaped rails (13, 14) in a frame shape which form a receptacle open at the top for the plate-shaped damping frame (15).

3. In a switchgear cabinet in accordance with claim 2, wherein
the rack (20) and the base (10) are loosely connected with each other in a plurality of corner areas through the damping frame (15) by a plurality of screws (19).

4. In a switchgear cabinet in accordance with claim 3, wherein the rack (20) is resiliently suspended in an area of an upper frame of the rack (20) by a plurality of spring elements (41) on a support rail (40).

5. In a switchgear cabinet in accordance with claim 1, wherein in an upper area of the rack (20) the mounting plate (30) is fastened with a plurality of damping blocks (35) on a plurality of fastening elements (33, 34) which are connected with the rack (20).

6. In a switchgear cabinet in accordance with claim 5, wherein
the damping frame (15) has a vertical bar (16) filling a space between the frame legs (24, 27, 28) of the lower frame of the rack (20) and the guide frame.

7. In a switchgear cabinet in accordance with claim 1, wherein the U-shaped of rails are fastened on the damping frame (15).

8. In a switchgear cabinet in accordance with claim 1, wherein the rack (20) and the base (10) are loosely connected with each other in a plurality of corner areas through the damping frame (15) by a plurality of screws (19).

9. In a switchgear cabinet in accordance with claim 1, wherein the rack (20) is resiliently suspended in an area of an upper frame of the rack (20) by a plurality of spring elements (41) on a support rail (40).

10. In a switchgear cabinet in accordance with claim 1, wherein in an upper area of the rack (20), the mounting plate (30) is fastened with a plurality of damping blocks (35) on a plurality of fastening elements (33, 34) which are connected with the rack (20).

11. In a switchgear cabinet in accordance with claim 1, wherein the damping frame (15) has a vertical bar (16) filling a space between the frame legs (24, 27, 28) of the lower frame of the rack (20) and the guide frame.

12. In a switchgear cabinet in accordance with claim 1, wherein a plurality of rails are fastened on the damping frame (15).

13. In a switchgear cabinet with a rack fastened on a frame base, wherein the rack is assembled with frame legs and the rack is closed by a wall element, the improvement comprising:

a lower frame of the rack (20) connected by undersides of the frame legs (24, 27, 28) by a plate-shaped damping frame (15) to a top of the base (10), and the top of the base (10) supporting a plurality of U-shaped rails (13, 14) in a frame shape which form a receptacle open at the top for the plate-shaped damping frame (15).

14. In a switchgear cabinet with a rack fastened on a frame base, wherein the rack is assembled with frame legs and the rack is closed by a wall element, the improvement comprising:

a lower frame of the rack (20) connected by undersides of the frame legs (24, 27, 28) by a plate-shaped damping frame (15) to a top of the base (10), the rack (20) resiliently suspended in an area of an upper frame of the rack (20) by a plurality of spring elements (41) on one of a support rail (40) and a support frame.

* * * * *